United States Patent Office 3,457,243
Patented July 22, 1969

3,457,243
FLAME-RESISTANT HYDROCARBON POLYMERS
Philip Strubing Blatz, Wilmington, Del., assignor to E. I. du Pont de Nemours and Company, Wilmington, Del., a corporation of Delaware
No Drawing. Filed Mar. 30, 1966, Ser. No. 541,447
Int. Cl. C08f 27/00; C09k 3/28
U.S. Cl. 260—79.5         5 Claims

ABSTRACT OF THE DISCLOSURE

Substantially olefinic hydrocarbon polymers are rendered flame-resistant by reacting the polymer with selected oxygenated derivatives, for example, sulfuric acid, amino sulfonic acid, and telluric acid with the polymer thereby attaching the group

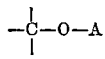

to the polymer chain through an uninterrupted carbon to carbon linkage. The A atom in the group is sulfur, selenium or tellurium and is present from 1 per 1000 carbon atoms to 4 mol percent based upon the polymer.

---

This invention relates to the formation of flame-resistant polymers which are substantially hydrocarbon in nature.

The present invention is realized by chemically bonding sulfur, selenium or tellurium to a substantially olefinic hydrocarbon polymer in a structure containing the atoms carbon, oxygen and one of the aforesaid three elements, bonded together in that order, with the carbon atom of the structure being in the main chain of the polymer by a carbon to carbon linkage or in a side chain bonded to the main chain through an uninterrupted sequence of carbon to carbon bonds.

While flame-retardancy can be achieved in polyethylene by incorporating 25 to 50 weight percent of a mixture of an antimony oxide and a chlorinated hydrocarbon, the mixture has a deleterious effect on the properties of the base resin. Comparable flame-retardancy can be achieved by means of the present invention usually using less than 5 weight percent of flame-proofing agent. The required weight percentage of the agent introduced will, of course, vary somewhat with its molecular weight.

The requisite arrangement of carbon, oxygen and either sulfur, selenium or tellurium atoms within the polymer can be accomplished by reacting the polymer with compounds represented by the formulae

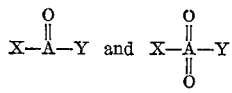

wherein A is selected from the group consisting of sulfur, selenium and tellurium, X is selected from the group consisting of OH and halogen and Y is selected from the group consisting of $NH_2$, OH, halogen and OR, wherein R is selected from the group consisting of alkyl and aryl radicals having 1 to 12 carbon atoms and monobasic ammonium and alkali metal salts and anhydrides of the above hydroxyl containing compounds and selenium dioxide. Examples of flame-proofing agents within the purview of this invention include sodium benzene sulfonate, ammonium acid sulfate, selenious acid, sulfuric acid, sulfrous acid, sulfuryl chloride, thionyl chloride, chlorosulfuric acid, p-toluene sulfonic acid, amino sulfonic acid, methyl sulfonic acid, methyl chlorosulfonic acid, isoethionic acid, ethionic acid, methane disulfonic acid, selenium dioxide, selenium oxychloride, selenic acid, toluene selenic acid, phenyl selenious acid, telluric acid, and compounds having the formulae

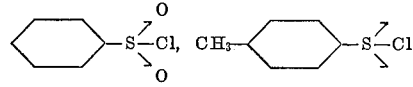

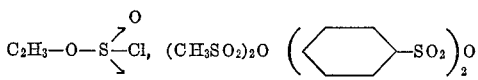

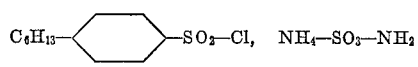

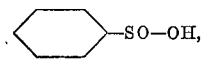

and

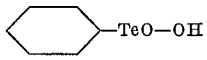

The flame-proofing agents must be compatible with the polymer, i.e., the agent should be in a form which permits it to be intimately contacted with the polymer and should be sufficiently stable to permit thorough mixing at processing temperatures. Some of the flame-proofing compounds such as sulfuric acid will degrade the polymer and one skilled in the art will recognize that such compounds must be reacted with the polymer under conditions which minimize the degradation.

The sulfur derivatives are especially preferred as flame-proofing agents because of their ready availability and because of the minimum of hazards encountered in their handling as compared to the derivatives selenium and tellurium.

The present invention is applicable to completely olefinic hydrocarbon polymers and certain other copolymers containing an olefinic comonomer. The term "substantially olefinic hydrocarbon polymers" as used herein encompasses both of the aforementioned types of polymers.

Completely olefinic hydrocarbon polymers or copolymers, i.e., those polymers containing carbon and hydrogen atoms exclusively must be milled in the presence of an activator such as oxygen or a free-radical initiator to provide sites on the polymer chain for reaction with the flame-proofing agent. These completely olefinic hydrocarbon polymers used herein most often are prepared by conventional free-radical or coordination polymerization processes or by grafting in the case of the copolymers. Monomers used either singly or in combination in the preparation of these completely hydrocarbon polymers are mono-α-olefinic hydrocarbons containing 2 to 18 carbon atoms and having the structure $CH_2=CHR_2$, wherein $R_2$ is selected from the group consisting of hydrogen and alkyl and aralkyl radicals having 1 to 16 carbon atoms, e.g., ethylene, propylene, 1-butene, 1-hexene, 1-octene, 1-decene, 1-dodecene, 1-tetradecene, 1-hexadecene, 1-octadecene, 4-phenyl butene-1 and the like, with the 2 to 8 carbon atom olefins being preferred.

Copolymers containing an olefinic comonomer which are useful in the present invention are usually prepared by a free-radical polymerization of a mono-α-olefinic hydrocarbon having the structure $CH_2=CHR_2$, wherein $R_2$ is selected from the group consisting of hydrogen and alkyl and aralkyl radicals having 1 to 16 carbon atoms, and a monoethylenically unsaturated comonomer from the group consisting of vinyl esters of fatty acids having 1 to 18 carbon atoms, alkenoic and alkenedioic acids, alkenetricarboxylic acids, methylene alkanedioic acid and derivatives thereof. These copolymers can be post-reacted with the flame-proofing agents of this invention. More particularly, the monoethylenically unsaturated comonomer may be described as carboxy (—COOH), carbalkoxy (—COOR₁) and acyloxy

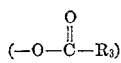

derivatives of mono-α-olefinic hydrocarbons, where $R_1$ is selected from the group consisting of alkyl and aryl radicals having 1 to 18 carbon atoms and $R_3$ is selected from the group consisting of alkyl and aryl radicals having 1 to 17 carbon atoms. The acid copolymers can be converted to the corresponding acid halide or anhydride by conventional methods prior to reaction with the above-described compound. Examples of these monoethylenically unsaturated comonomers are vinyl formate, vinyl acetate, vinyl propionate, vinyl butyrate, acrylic acid, methacrylic acid, fumaric acid, maleic acid, itaconic acid, aconitic acid and the like. The preferred comonomers are vinyl acetate, acrylic and methacrylic acids, methyl and ethyl acrylates, methyl and ethyl methacrylates and methacrylyl chloride.

If a copolymer is used in the present process, the amount of bound comonomer is limited to the range 0.2 to 13 mole percent to minimize the deleterious effects which the comonomers exert on the desirable properties, and preferably is limited to a maximum of 4 mole percent. In addition to standard copolymerization, copolymers may also be prepared by grafting the appropriate monomer to preformed polymer thereby permitting a nonolefinic substituted flame-proofing agent to be incorporated into the polymer.

The effectiveness of the sulfur, selenium or tellurium derivatives in imparting flame-resistance to the polymer in the present invention requires that only a fraction of the comonomer reactive groups need be interchanged with the flame-proofing agent; however, complete reaction is within the purview of this invention.

Reaction following polymerization is conveniently utilized to introduce the flame-proofing agent by milling or compounding the reactants at elevated temperatures. The temperature and time of milling will vary with the particular polymer and flame-proofing compound, but, generally, milling is carried out above the softening temperature of the polymer, usually within the temperature range 100 to 250° C., and especially 125 to 200° C. for a period of 5 to 15 minutes.

Regardless of the method of introducing the flame-proofing agent, the polymers disclosed herein may have bound therein up to 15 percent of either sulfur, selenium or tellurium, although as little as about 0.1 percent sometimes will suffice. The resin must contain at least one sulfur, selenium or tellurium atom per 1000 carbon atoms of the principal polymer. The bound sulfur, selenium or tellurium usually should not exceed 5 percent, and preferably 2.5 weight percent of the hydrocarbon polymer so as to minimize alteration of the polymer's properties.

The flame-resistant products prepared by the aforementioned techniques may be dissolved and reprecipitated, or, alternately, may be extracted or fractionated using appropriate polymer solvents and nonsolvents in order to ensure that the flame-proofing agent is chemically bonded to the polymer rather than physically intermixed therewith. Infrared analysis may be utilized to confirm the presence of the carbon-oxygen-sulfur, selenium or tellurium linkage, while a variety of standard analytical techniques may be used to determine the amount of sulfur, selenium or tellurium which has been introduced. On the basis of the above, it has been determined that the flame-resistant compositions described herein contain the group C—O(S, Se or Te)

with the carbon atom of said group being chemically bonded to the hydrocarbon polymer by a carbon-carbon linkage. Although only a post-reaction technique is described hereinabove and in the following examples, it should be apparent to one skilled in the art that the linkage may be inserted in a substantially olefinic polymer by copolymerization or postpolymerization employing comonomers or polymers already containing the linkage.

The following examples are presented to illustrate but not to restrict the present invention. Melt index was measured by ASTM test method D1238–57T Condition E.

EXAMPLE 1

To 50 grams of an ethylene-vinyl acetate copolymer having a melt index of 23.2 (containing 8 weight percent bound vinyl acetate) which is banded on a 2 inch diameter rubber mill at 180° C. are added slowly 2.0 grams of sodium benzene sulfonate. Milling is continued for about 10 minutes to ensure interaction and the sample having a melt index of 25 is sheeted off the rolls.

EXAMPLE 2

To 50 grams of an ethylene-vinyl acetate copolymer having a melt index of 10.3 (containing 8 weight percent bound vinyl acetate) which is banded on a 2 inch diameter rubber mill at 180° C. are added slowly 5.0 grams of ammonium acid sulfate. Milling is continued for about 10 minutes to ensure interaction and the sample is sheeted off the rolls.

EXAMPLE 3

To 50 grams of an ethylene-vinyl acetate copolymer (containing 28 weight percent bound vinyl acetate) which is banded on a 2 inch diameter rubber mill at 180° C., are added slowly 4.5 grams of selenium dioxide. Milling is continued for about 10 minutes to ensure interaction and the sample is sheeted off the rolls.

EXAMPLE 4

To 50 grams of a free-radical produced polyethylene having a density (measured by standard ASTM test method D 1505–57T) of 0.915 and a melt index of 23 are added slowly while being banded at 190° C. on a rubber mill 5.0 grams of ammonium acid sulfate. Milling is continued for about 10 minutes to insure interaction and the sample is sheeted off the rolls.

EXAMPLE 5

To 50 grams of ethylene methacrylic acid copolymer containing 10 weight percent bound methacrylic acid which is banded on a 2 inch diameter rubber mill at 180° C. are added slowly 11 grams of benzene sulfonyl chloride. Milling is continued for about 18 minutes to insure interaction and a sample is sheeted off the rolls.

EXAMPLE 6

To 50 grams of an ethylene methacrylyl chloride copolymer containing 12 weight percent bound methacrylyl chloride which is banded on a 2 inch diameter rubber mill at 180° C. are added slowly 11 grams of paratoluene sulfonic acid. Milling is continued for about 18 minutes to insure interaction and a sample is sheeted off the rolls.

The products from Examples 1 through 6 are evaluated for flame-resistance by means of the standard ASTM flammability test method D 635–56T. All are self-extinguishing, whereas control samples of the untreated resin are consumed at a rate of 3 inches of sample length in from 2.5 to 3.5 minutes.

The flame-resistant compositions prepared by means of this invention are useful in any application employing similar but nonflame-resistant resins. These applications include uses as shaped structures such as a film, fiber, tubing, wire coating, rod stock and a cellular or foamed structure. For example, a flame-resistant extrudate from the orifice of a melt indexer, while still molten, is drawn into a fiber having good flexibility and toughness.

When a suitable mandrel is positioned at the orifice of the melt indexer, the extrudate is shaped into tubing or pipe also having good flexibility and toughness. A sample of a flame-resistant resin as prepared herein is compression molded between platens for one minute at 180° C.

and 30,000 p.s.i. to give a transparent film which is useful as a wrapping or protective cover. A similar sample which contains 0.75% of an azodicarbonamide blowing agent is extruded through a melt indexer at 200° C. to yield a compressible cellular structure having utility as a packaging cushion. When a 0.025 inch copper wire is drawn through a molten sample of a flame-resistant resin as prepared herein, it is provided with a protective insulation which adheres to the wire despite extended flexing. Still another sample is injection molded from a conventional injection molding machine at 230° C. into the cavity of a cool mold to produce a flame-resistant, molded, shaped structure. The following table lists the properties of a typical flame-resistant product prepared as set forth in Example 2.

| | |
|---|---|
| Melt index | 12.6 |
| Density | 0.938 |
| Tensile modulus (ASTM D 1530–58T) _p.s.i._ | 14,400 |
| Percent elongation (ASTM D 412–51T) | 355 |
| Tensile strength (ASTM D 412–51T) _p.s.i._ | 1,500 |
| Elmendorf tear (ASTM D 689–44) _____grams/mil_ | 155 |
| Dielectric constant (ASTM D 150–54T) | 3.1 |
| Dissipation factor (ASTM D 150–54T) | 0.0045 |
| Volume resistivity (ASTM D 257–58) _____ohm-cm__ | $8.5 \times 10^{15}$ |

I claim:
1. A flame-resistant composition comprising a normally solid, substantially olefinic hydrocarbon polymer, said polymer having the group

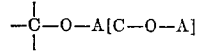

substantially uniformly therethrough, wherein A is selected from the class consisting of sulfur, selenium and tellurium with the carbon atom of said group being chemically bound to said polymer by at least one carbon to carbon linkage, said composition having from one A atom per 1000 carbon atoms to 4 mole percent of A atoms based upon said polymer.

2. The composition of claim 1 wherein the substantially olefinic hydrocarbon polymer is polyethylene.

3. The composition of claim 1 wherein the substantially olefinic hydrocarbon polymer contains at least 87 percent bound mono-α-olefinic hydrocarbon and a bound monoethylenic, unsaturated comonomer.

4. The composition of claim 1 wherein the substantially olefinic hydrocarbon polymer is a copolymer of ethylene and methacrylic acid.

5. The composition of claim 1 wherein the substantially olefinic hydrocarbon polymer is a copolymer of ethylene, vinyl acetate and methacrylic acid.

References Cited

UNITED STATES PATENTS 2,624,725   1/1953   Bjorksten et al. ____ 260—93.5

JOSEPH L. SHOFER, Primary Examiner

STANFORD M. LEVIN, Assistant Examiner

U.S. Cl. X.R.

260—80.8, 87.3, 88.1, 93.7, 94.9